June 22, 1943.  F. W. GUIBERT ET AL  2,322,436
MEASURING DEVICE FOR LIQUIDS
Filed Dec. 27, 1938  6 Sheets-Sheet 1
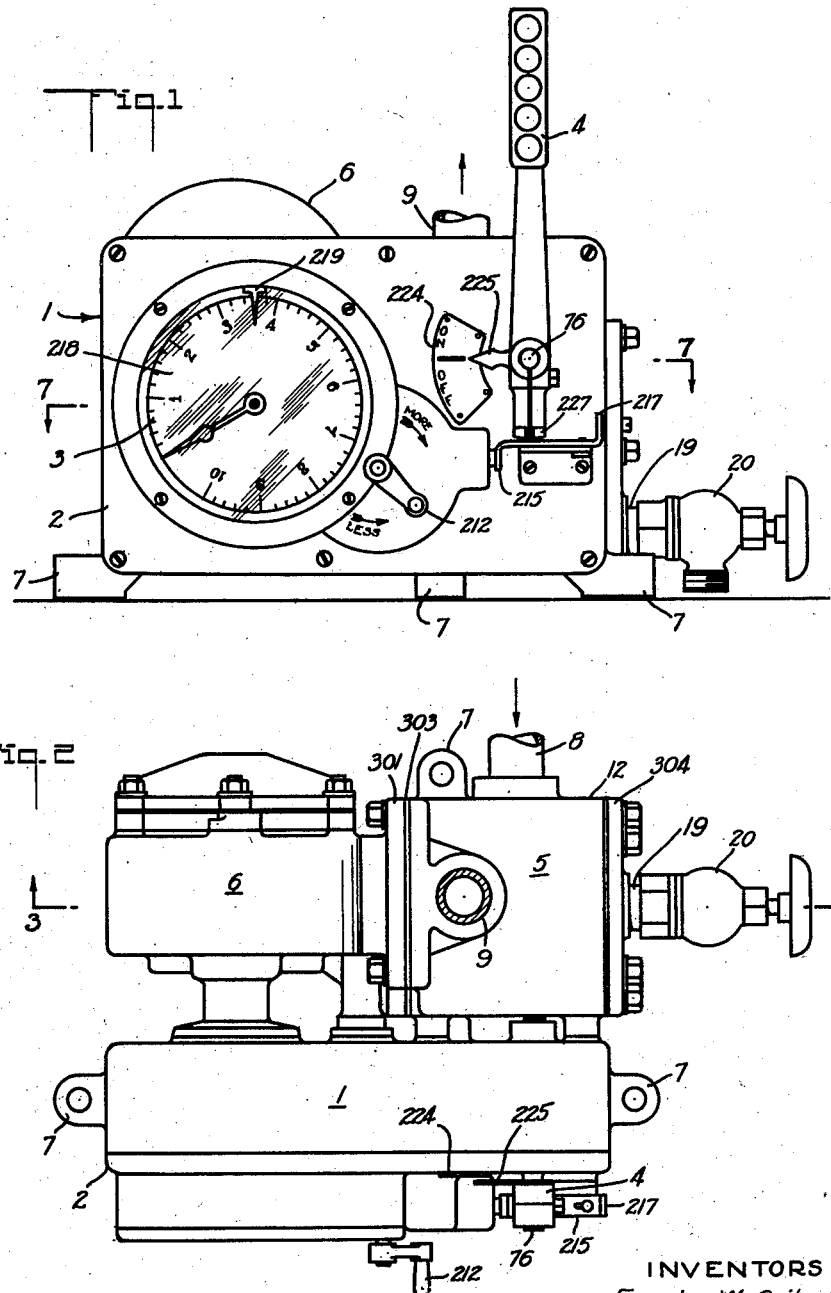
INVENTORS
Francis W. Guibert
Frederic B. Fuller
BY John Flann
ATTORNEY

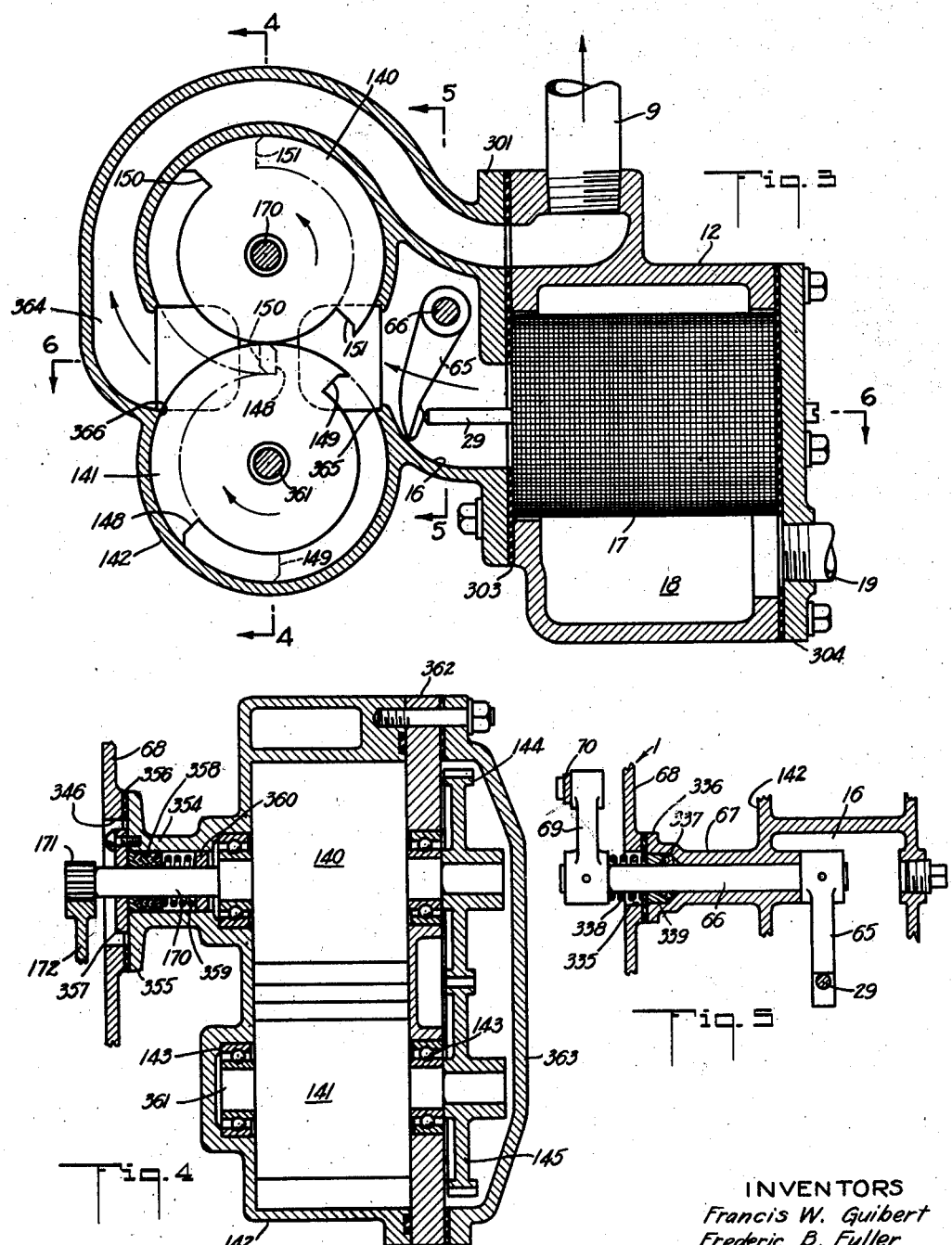

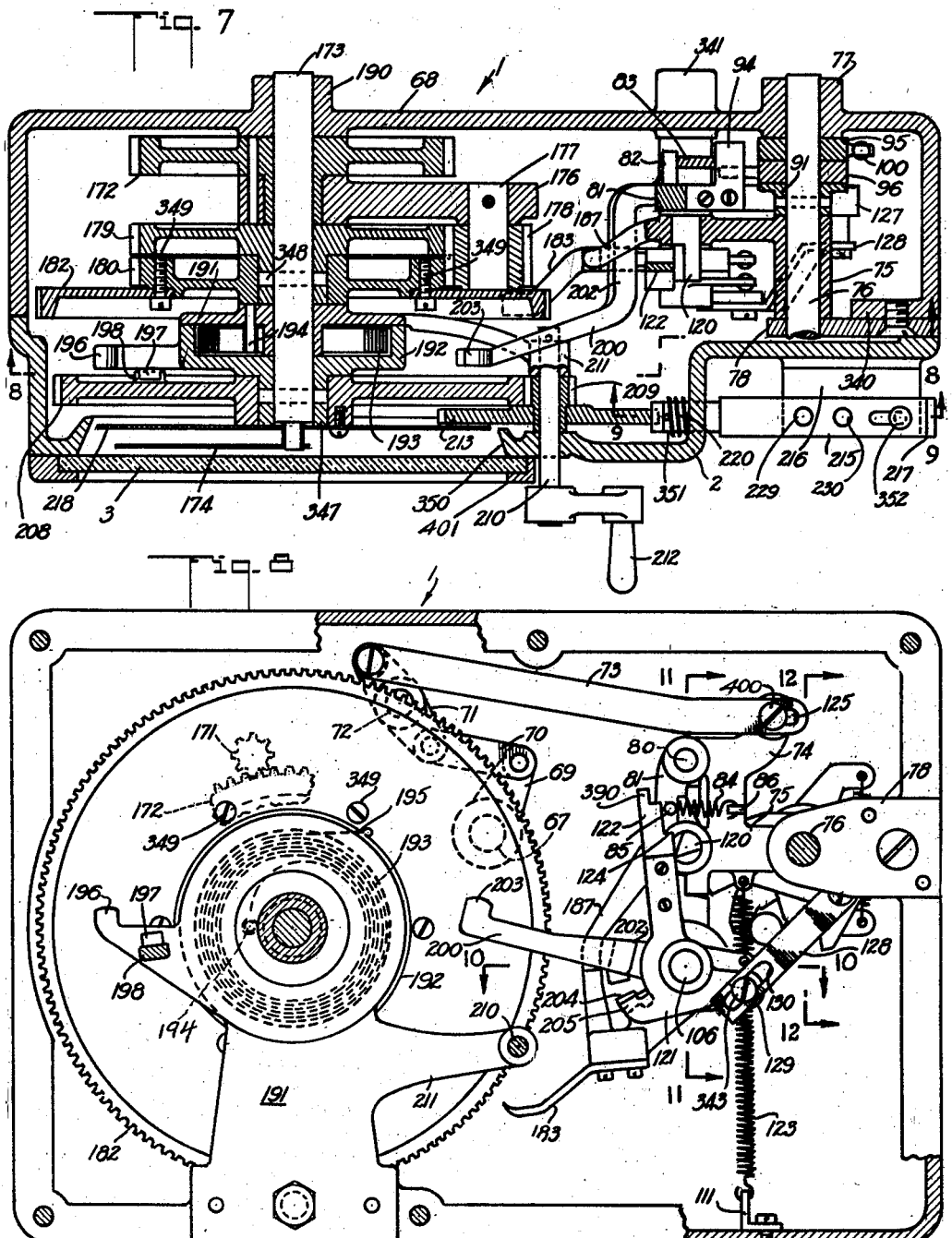

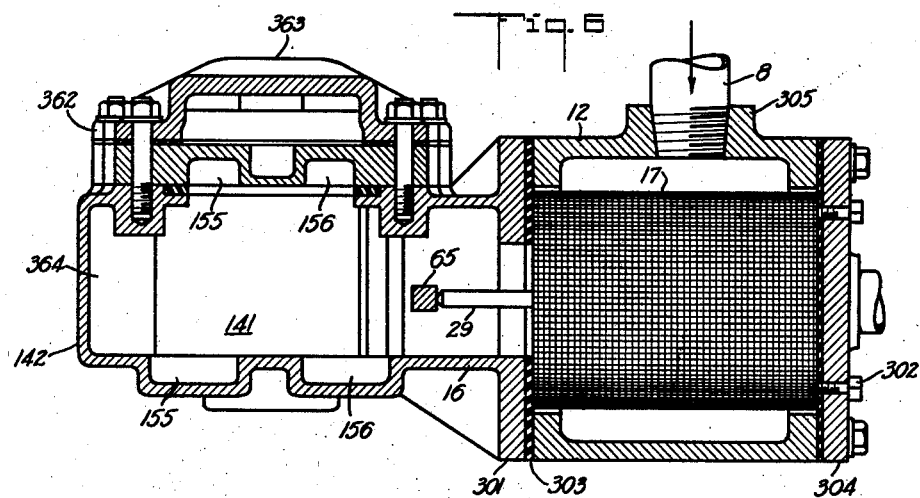
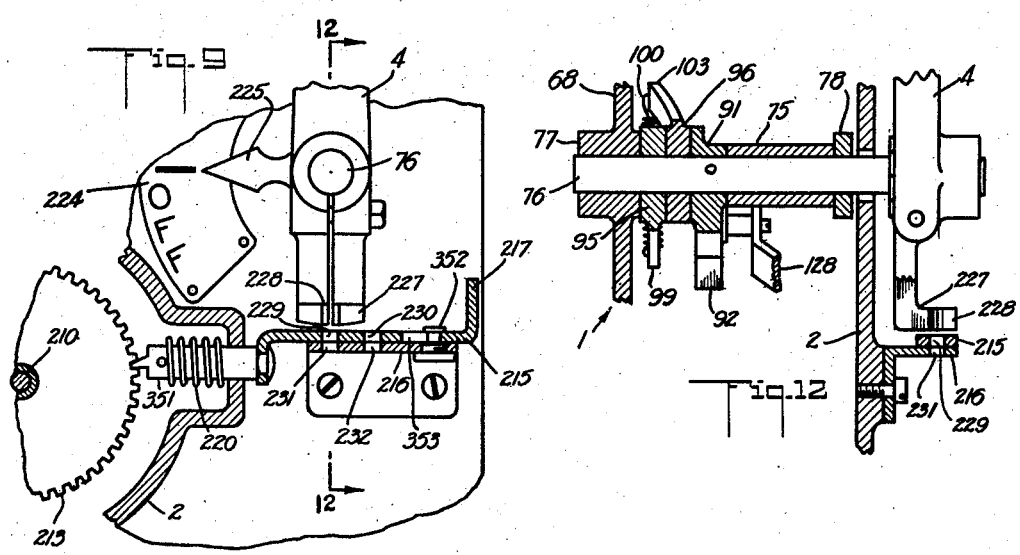

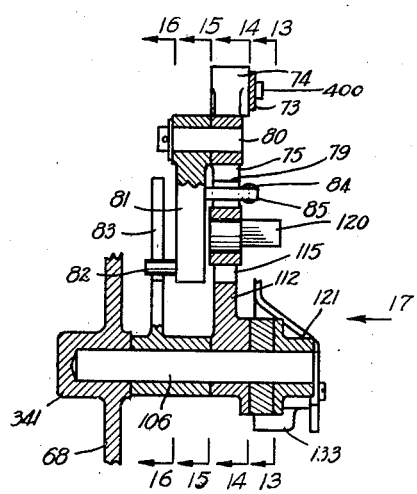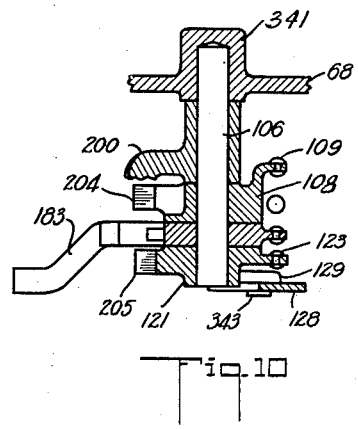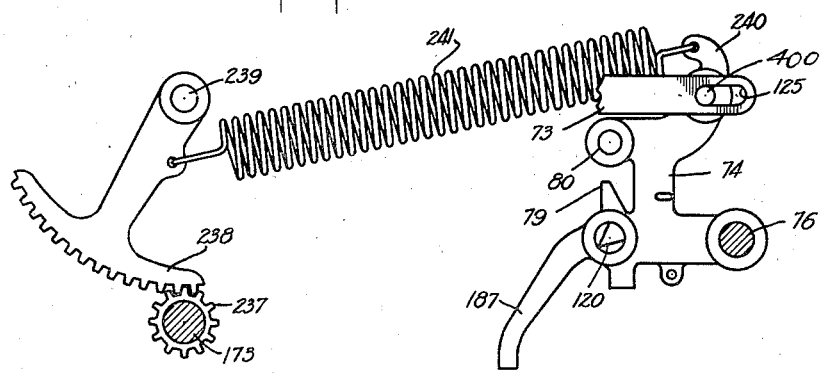

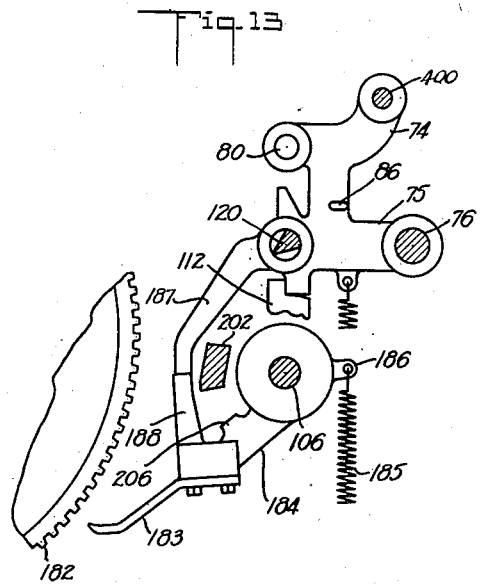
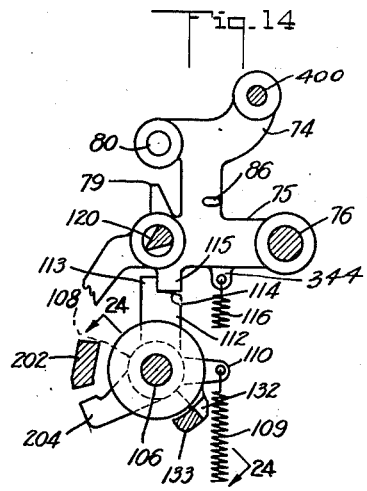
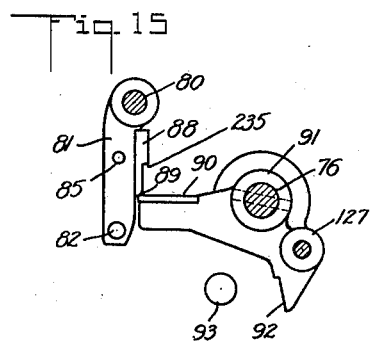
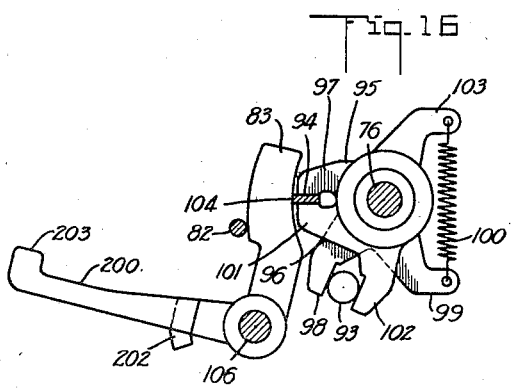
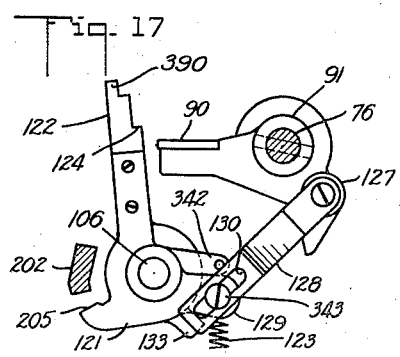
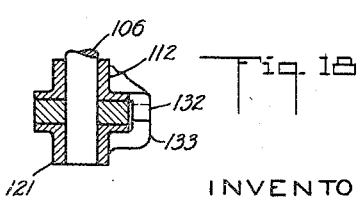
INVENTORS
Francis W. Guibert
Frederic B. Fuller
BY John Flam
ATTORNEY Patented June 22, 1943

2,322,436

UNITED STATES PATENT OFFICE 2,322,436

MEASURING DEVICE FOR LIQUIDS

Francis W. Guibert, Beverly Hills, and Frederic B. Fuller, Whittier, Calif.; said Fuller assignor to said Guibert Application December 27, 1938, Serial No. 247,966

22 Claims. (Cl. 221—101)

This invention relates to a device for controlling the flow of liquid; and especially to one that can be set at will to deliver batches of liquid of predetermined volume.

An apparatus of this general character is described and claimed in a copending application, filed in the name of Francis W. Guibert and Frederic B. Fuller, on August 5, 1936, under Serial Number 94,408, and entitled: "Adjustable liquid metering device," now Patent No. 2,222,660 granted November 26, 1940. The present application is a continuation in part, of said prior patent.

The essential elements of such apparatus include a flow measuring device, such as a water meter, a valve controlling the flow, apparatus manually operable for opening the valve, and an automatic control for causing the valve to close upon a predetermined delivery. This last element is arranged to be adjusted or set to cause the valve to deliver any desired quantity of liquid within the limits of adjustment afforded by the mechanism.

The apparatus may be utilized in general wherever accurately predetermined quantities of liquid are to be delivered, as for example, water for a concrete or cement mixture, or gasoline from a gasoline reservoir.

It is one of the objects of this invention to improve in general, apparatus of the character referred to.

It is another object of this invention to make it possible, during the delivery of the liquid, readily to ascertain the amount of liquid already delivered, the amount yet to be delivered in the cycle, as well as the total amount to be delivered.

It is still another object of this invention to improve the accuracy of the apparatus.

It is still another object of this invention to make it possible to manually control the delivery of liquid even after the cycle is initiated, either to reduce the rate of flow, or to stop it entirely, or to cut the cycle short; all with a single operating lever. In this connection, the apparatus is so arranged that such manual control may be optionally prevented.

It is a further object of this invention to provide apparatus of the character disclosed having means to relieve the metering mechanism of the work of operating the timing mechanism, thereby improving the accuracy of the measurement.

This invention possesses many other advantages, and has other objects which may be made more easily apparent from a consideration of several embodiments of the invention. For this purpose there are shown a few forms in the drawings accompanying and forming part of the present specification. These forms, which illustrate the general principles of the invention, will now be described in detail; but it is to be understood that this detailed description is not to be taken in a limiting sense, since the scope of the invention is best defined by the appended claims.

In the drawings:

Figure 1 is a front elevation of a device embodying the invention;

Fig. 2 is a top plan view of the device shown in Fig. 1;

Fig. 3 is a section on an enlarged scale as seen on plane 3—3 of Fig. 2;

Fig. 4 is a cross section on an enlarged scale as seen on plane 4—4 of Fig. 3;

Fig. 5 is a fragmentary section as seen on plane 5—5 of Fig. 3;

Fig. 6 is a longitudinal section as seen substantially on plane 6—6 of Fig. 3;

Fig. 7 is a horizontal section on an enlarged scale as seen substantially on plane 7—7 of Fig. 1, but showing only the timer case and contained mechanism;

Fig. 8 is a front view of the timer with the cover removed, substantially as seen on plane 8—8 of Fig. 7;

Fig. 9 is a detail section as seen on plane 9—9 of Fig. 7;

Figs. 10, 11 and 12 are fragmentary sections as seen on correspondingly numbered planes of Fig. 8;

Figs. 13, 14, 15 and 16 are fragmentary sections as seen substantially on correspondingly numbered planes of Fig. 11;

Fig. 17 is a fragmentary elevation as seen from the right of Fig. 11;

Fig. 18 is a detail section as seen on plane 18—18 of Fig. 14; and

Fig. 19 is a fragmentary view, mainly diagrammatic, showing a modification of the timer mechanism.

The liquid metering device includes three main elements: a liquid measuring device; a control valve through which the liquid to be metered is passed; and a trip or control mechanism by means of which the valve is operated to close at the end of a metering cycle.

These elements may all be assembled into a compact unit, as best shown in Figs. 1 and 2. Thus the trip and control mechanism is all mounted within a metal case 1, having a detachable cover 2 permitting ready access to the mechanism and carrying a glass window 3, through which indicating means are visible, as well as the operating member or handle 4. The control valve 5 is mounted within another casing which is secured to the back of the timer casing 1. The liquid measuring device 6 also includes a housing which is attached to the control valve housing, as well as to the back of the trip mechanism casing 1. The unit is supplied with suitable supporting feet 7 by means of which it may be mounted on a base or other suitable support.

After a predetermined amount of liquid has been delivered, as determined by the liquid measuring device, the trip mechanism operates to close the valve. This completes the cycle which began with the opening of the valve.

The control valve 5 may be located anywhere in the path of the liquid flow, but in the present form of the device, it is located so that the liquid passes through it, and then into the measuring device 6. The valve housing is provided with an intake conduit 8 (Figs. 2 and 6), adapted to be connected to a source of liquid supply under pressure. The liquid passes through the valve and directly into the housing of the measuring device. After passing through the liquid measuring device, it is discharged through conduit 9 (Figs. 1 and 2) which by means of suitable extensions, leads to the place where the liquid is to be used.

The control valve is shown generally in Figs. 3 and 6. Its specific details are of no importance so far as the present invention is concerned.

The valve 5 has a body member or casing 12 which is provided at its left hand end as shown in Fig. 6 with a series of bosses by the aid of which the flange 301 of the liquid metering device 6 (Figs. 2, 3 and 6) may be attached. This flange 301 is provided with an extension passage 16 leading into the casing of the meter 6 and forming a discharge passage from the valve housing 12. In order to provide a fluid tight connection between the meter 6 and the casing 12, an appropriate sealing means or gasket 303 may be interposed between them. The opposite end of the casing 12 is shown as closed by a cover member 304.

The inlet conduit 8 is attached to a boss 305 (Fig. 6) formed on casing 12. The water or other liquid passes through conduit 8 into body 12, and its further passage into extension 16 is controlled by the aid of a stem 29. The body 12 includes a screen 17 in order to strain the liquid before it enters into the valve parts enclosed within the screen 17.

In order to make it easy to remove such foreign matter as may reach the outside of the screen 17, this matter is allowed to collect in a sump 18 (Fig. 3). The accumulated matter may be withdrawn by the opening of a tap 20 (Figs. 1 and 2) which is attached to cover 304 by a pipe extension 19.

The degree of opening of the valve 5 is determined by the axial position of stem 29 (Figs. 3 and 6). This stem may, if desired, be maintained in a position intermediate the fully open and the fully closed positions to permit valve 5 to discharge at a dribbling rate. This position is obtained automatically by aid of the control apparatus to be hereinafter described.

The valve structures herein illustrated are claimed in application Serial No. 290,009, filed August 14, 1939, in the names of Francis W. Guibert and Frederic B. Fuller, and entitled "Valve."

The control of the stem 29 in order to urge the valve to opening position is accomplished in this instance by the aid of an operating member or handle 4 illustrated in Figs. 1 and 2. The operating mechanism between the operating handle 4 and the pilot valve stem can be best explained in connection with Figs. 1, 2, 3, 5, 7, 8, 9, 10, 11, 12, 13, 14, 15, 16, and 17.

As shown most clearly in Fig. 3, the valve stem 29 extends into the passage 16, and its left hand end is shown as engageable by the operating end of a rocking arm 65. This arm 65 is shown as mounted on a shaft 66 (Figs. 3 and 5) and extending into the casing 142 enclosing the measuring device. Thus the back wall 68 of the trip mechanism 1 is shown in Fig. 5 as having an aperture 335 around the edge of which is fastened the flange 336 of the sleeve 67 through which the shaft 66 passes. This sleeve 67 is shown (Figs. 2 and 5) as extending from the housing 142 of the liquid metering device 6.

In order to prevent passage of any liquid from the liquid metering device 6 into the trip mechanism 1 past the wall 68 there are provisions, as illustrated in Fig. 5, to provide a seal around the shaft 66. This may be in the form of a packing 337 surrounding the shaft 66 and compressed by the aid of a compression spring 338 acting on the gland collar 339.

The left hand end of the shaft 66 carries the crank arm 69 (Figs. 5 and 8). This lever in turn (Fig. 8) has pivoted at its free extremity, a connecting link 70. The arm 69 and link 70 are disposed within the trip mechanism casing 1. The link 70 in turn is connected to one arm of a rocking lever 71 supported on a stub shaft 72 appropriately journaled in the wall 68. The other arm of lever 71 is connected to a link 73. This link 73 as shown most clearly in Fig. 8 is provided with a slot 125 in which a pin 400 is accommodated. This pin is shown to best advantage in Figs. 8 and 11. The pin 400 is carried by an arm 74. Movement of arm 74 toward the right as viewed in Fig. 8, will first of all take up the lost motion between pin 400 and the end of slot 125. Thereafter, link 73 is pulled toward the right, swinging lever 71 in a clockwise direction. This clockwise motion in turn causes link 70 to be pulled toward the left and crank arm 69 to be rotated in a counterclockwise direction. This movement of the crank arm 69 causes a corresponding movement of the rocking arm 65 (Fig. 5) which in turn causes the valve stem 29 to be urged toward opening position. The extent of movement of the arm 74 therefore controls the extent of opening of the valve 5.

The arm 74 and its operation are best disclosed in connection with Figs. 7, 8, 11, 13 and 14. This arm 74 forms one of several projections formed on a lever 75 which may be termed the control driven arm. The shaft 76 upon which lever 75 is mounted, is journaled in a boss 77 (Figs. 7 and 12) projecting from the rear wall 68 of the casing 1 for the control mechanism. At its front end, shaft 76 is similarly journaled by a bracket 78 (Figs. 7 and 8) attached in any convenient manner to a projection or ear 340 projecting inwardly from the right hand wall of casing 1.

A mechanism is provided whereby a clockwise rotation of handle 4 will cause a clockwise rotation of the arm 75 about the axis of shaft 76. The handle 4 (Fig. 12) is securely attached to the forward end of shaft 76 so that this shaft will be rotated by movement of the handle 4. The shaft 76 is shown as projecting through the forward wall of the cover 2, so as to make it possible for the handle 4 to be conveniently attached. Shaft 76 carries a driving arm 91 (Figs. 12, 15 and 17) whereby operation of handle 4 causes corresponding movement of arm 91. This driving arm has a flat, hard wearing plate 90 attached thereto, which is adapted to engage the bottom edge 89 of a latch plate 88. This plate is fastened to the left hand edge of a latch arm 81 pivoted on the driven arm 75, as by the aid of a pin 80. The latch arm 81 is urged by the spring 84 (Fig. 8) in a counterclockwise direction so as to maintain the plate 88 (Fig. 15) in operative relation with the plate 90. This spring is anchored to an eye 86 on the arm 75 and to a stop pin 85 carried by the latch 81. This pin 85 also serves to limit the counterclockwise movement of the latch 81 by the aid of the stop arm 79 (Fig. 14) carried on the driven arm 75.

As shaft 76 is turned in a clockwise direction (Fig. 15) by clockwise movement of the operating handle 4, the plate 90 engaging the surface 89 will raise the latch arm 81 and thereby the control driven arm 75 will be correspondingly rotated in a clockwise direction, performing the function of opening the valve 5.

The operation of the handle 4 in this manner may be such that the valve 5 may be held open to any desired extent, corresponding to the angular movement of the shaft 76. However, provisions are made for making it possible to release the handle 4, and yet to maintain the arm 75 in any one of several open positions; that is, either a dribble position or a fully open position.

For this purpose use is made of a rocking pilot latch member 121 (Figs. 8, 10, 11 and 17). This member is mounted for rotation about a shaft or pin 106 disposed somewhat below and to the left of shaft 76. This pin is attached at its inner end in a boss 341 (Figs. 10 and 11) formed on the rear wall 68 of casing 1.

The latch member 121 carries a latch extension 122 having a stepped surface 124. It is urged continuously in a clockwise direction by a tension spring 123 anchored to an ear 342 (Fig. 17) formed integrally with the latch member 121. The lower end of the spring 123 is anchored to a stationary anchor piece 111 (Fig. 8).

The extension 122 is preferably made from hardened material so as to resist wear.

Cooperating with the latch extension 122 is a flat sided latch stud or knife edge 120 (Figs. 7, 8, 11, 13, and 14). This latch stud is carried on the arm 75. Due to the tension of spring 123 the plate 122 is swung until its right hand edge is in contact with the narrow edge of the stud 120 (Fig. 8). Now as the arm 75 is rotated in a clockwise direction about the axis of the shaft 76, and from the position of Fig. 8, the latch stud 120 moves upwardly to a position where the stepped surface 124 engages underneath the latch stud 120. Thus arm 75 and connected parts are releasably retained in valve opening position. If there is no further rotation of the arm 75 the valve 5 is open to a dribble or intermediate position, the lost motion of slot 125 having been taken up, and valve stem 29 having been moved part way. However, by rotating the arm 75 further, the top of the latch extension 122 can pass underneath the latch stud 120, and the valve 5 is latched in fully open position, and remains latched or releasably retained until the latch member 121 is rotated in a counterclockwise direction so as to release the latching stud 120.

The latch extension 122 is prevented from passing too far to the right by having an extension 390 (Fig. 17) of sufficient length to contact the edge of stud 120, when this stud is in its uppermost position.

In actual operation, the driving arm 91 may be rotated by the aid of the handle 4, so as to lift the latch arm 81 only part way, the latch stud 120 resting on the stepped surface 124; or else the arm 91 may be swung as far as permitted by the mechanism to cause the latch plate 81 and therefore the control driven arm 75 to be moved to fully open valve position. The driving arm 91 is limited against too far travel by the aid of a stopping pin 93 (Fig. 15) projecting from the back wall 68 of the casing 1. This stop pin 93 is intended to engage with the pad 92 shown as formed integrally with the arm 91.

The stub shaft 106 also rotatably supports the pilot detent lever 108 (see Fig. 14). Detent lever 108 has an upstanding arm or lock 112 with a stepped upper surface having a high and a low portion, 113 and 114, respectively thereon. These surfaces cooperate with a tooth or boss 115 depending from the control driven arm 75. Boss 115 rests on surface 114 when arm 75 is in its lowermost position, serving to prevent further rotation of the arm in response to spring 116.

Detent lever 108 is urged to rotate in a clockwise direction about its supporting shaft 106 by a tension spring 109 which is attached to an arm 110 on the detent and the common anchor 111 on the base of case 1. With the control driven arm 75 in its lowest position, rotation of detent lever 108 is prevented by the surface which joints surfaces 113 and 114 abutting the left side of boss 115. When the control driven arm 75 is turned clockwise about the axis of its supporting shaft 76 sufficiently to permit these contacting surfaces to clear, the detent lever 108 will be turned to bring the upper surface 113 under boss 115. This prevents arm 75 returning to its initial position until detent lever 108 is swung counterclockwise to its original position. Excess movement of the detent lever 108 is prevented by extension 204 carried thereby contacting member or arm 202 which may be considered as fixed at this time.

The arrangement is such that, assuming the valve 5 to have been opened, as previously described by clockwise rotation of handle 4, a counterclockwise rotation of the handle 4 and corresponding counterclockwise rotation of the driving arm 91, causes the pilot latch member 121 to be rocked out of the path of the latch stud 120. The angular motion of the pilot latch member 121 may be optionally limited so as to cause the latch stud 120 to drop on to the stepped surface 124 (Fig. 17), or it may be large enough to permit the latch stud 120 to drop to the initial position of Fig. 8. The mechanism whereby this unlatching may be effected will now be described. For this purpose attention is directed to Figs. 8, 15 and 17.

Thus the driving arm 91 carries a lever arm 127 to which is pivoted a link 128 (see particularly Fig. 17). The pilot latch member 121 has a lever arm 129 which carries a pin 343 passing through slot 130 in the link 128. Link 128 thus forms a lost motion connection between the operating handle 4 and member 121. The pilot latch member 121 also has a radial extension 133 which is adapted to engage a cooperating radial extension 132 formed on the pilot detent 108 (Fig. 14) when the latch member 121 is turned counterclockwise. Now upon sufficient counterclockwise rotation of shaft 76 to which the handle 4 is attached, the link 128 is pulled far enough upwardly to rock the pilot latch member 121 out of the path of the latch stud 120. Due to the engagement of extensions 132 and 133, pilot detent lever 108 is also swung sufficiently to bring its upper surface 113 far enough to the left to clear boss 115. Accordingly the control driven arm 75 is permitted to return to the initial position of Fig. 8, as by the aid of a suitable tension spring 116 attached to the eye 344 on the arm 75. This spring 116 extends to the common anchor 111.

Provisions are made to return the handle 4 to its vertical position of Fig. 1 after it is released. This centralizing mechanism is illustrated to best advantage in Figs. 7 and 16. Thus freely rotatable about the shaft 76 are a pair of rocking centralizers 95 and 96. One of these, such as 95, includes the arms 97, 98 and 99; the other centralizer 96 includes arms 101, 102 and 103. The arms 97 and 101 are urged to engage opposite sides of an extension 94 of the latch plate 90. This is accomplished by providing a tension spring 100, of considerable force, joining the arms 103 and 99. The arms 98 and 102 are urged thereby respectively against opposite sides of the stop pin 93.

Thus if the driving arm 91 is turned clockwise, the rear centralizer 95 turns with it, since extension 94 engages beneath the arm 97. The equalizer 96 is prevented from turning in this direction by stopping arm 102 engaging the stop 93. Accordingly the spring 100 is stretched by movement of arm 99 away from arm 103. Now if the force on handle 4 is released, the force of spring 100 acting through the arm 99, arm 97 and plate 94, returns the driving arm 91 to the central position. Similarly, if the arm 91 is turned in a counterclockwise direction, the front centralizer 96 turns with it, since plate extension 94 engages the arm 101. The rear centralizer 95 is prevented from turning in this direction by stop arm 98 engaging the stop pin 93. Thus arm 103 moves upward and stretches the spring 100. As soon as the handle 4 is released the centralizer spring 100 acts to return the driving arm 91 to the central position of Fig. 16.

As thus far described, only the manual operation of the valve 5 has been set forth. With nothing further, it is clear that the movement of the handle 4 in either direction will serve to control the opening and closing of the valve 5, as well as the degree of opening. Furthermore, by the aid of the various latches described, the valve can be maintained in open dribble position, or in full open position; and by counterclockwise movement of the handle 4, the valve 5 can be returned to the dribble position and left there or else upon continued movement of the handle 4 the valve can be caused to close entirely. By virtue of lock 112, the mechanism cannot be returned to its original position except by appropriate rotation of handle 4.

However, an automatic control is provided such that after the valve 5 has been opened either to dribble or full open position, the valve is caused to close irrespective of the position of the handle 4, after a predetermined amount of liquid is delivered through the valve 5.

We may assume for the present that the valve 5 has been opened and that control driven arm 75 is latched by the aid of the latch extension 122 and latch stud 120 in the fully open position. It is clear that in order to cause the valve to close it is merely necessary that the pilot latch member 121 and the latch extension 122 be rotated in a counterclockwise direction. This is accomplished by the aid of the arm 202 shown to best advantage in Figs. 7, 8, 13, 14, 16 and 17. This arm 202, which as heretofore stated, serves as an abutment for the abutment pad 205 of the latch member 121, is shown as formed integrally with a lever 200 (Fig. 8). This lever is mounted for free rotation about the pin 106. When the arm 200 is moved downwardly, or in a counterclockwise direction as viewed in Fig. 8, the arm 202 first engages the extension 204 of the pilot detent lever 108; and soon thereafter engages the abutment pad 205 of the pilot latch member 121. The control driven arm 75 is then freed from these latches and it returns first to a dribble position and then to the closed position of Fig. 14. The manner in which this lever 200 is depressed for this purpose will be described in connection with the automatic delivery mechanism.

At the same time, lever 200 ensures that the holding of the handle 4 in the opening position toward the right will not prevent the valve 5 from closing. For this purpose lever 200 is provided with an arm 83 (Figs. 7 and 16). This arm 83 when the lever 200 is swung downwardly, operates on the pin 82 of the pivoted latch arm 81 (Figs. 7, 15 and 16). This latch arm therefore is swung outwardly as viewed in Fig. 15, and the connection between the driving arm 91 and the driven arm 75 is destroyed. The latch plate 88 is urged far enough toward the left to cause it completely to clear the plate 90 of the driving arm 91. Arm 83 (Fig. 16) is provided with concentric arcuate faces centering on the axis of shaft 76 when the arm 200 is in the valve closed position. These arcuate faces are respectively in contact with the left hand edge 104 of extension 94 of plate 90, and the pin 82. Thus rotation of arm 91, carrying plate 90, is not interfered with, should it be desired to operate valve 5 manually as heretofore described.

The arm 83 is prevented from being swung too far to the right by its abutting the edge 104 of the extension 94 of the plate 90. This abutting relation is illustrated in Fig. 16.

The arrangement is such that upon a predetermined quantity of liquid passing through the valve 5, the end 203 of arm 200 is depressed in order to close the valve 5 in the manner just described. This mechanism is quite similar to that described in the earlier filed application hereinbefore referred to.

It may be assumed for the present that the passage of the liquid through the liquid measuring device 6 rotates a shaft 170 in a counterclockwise direction (Figs. 3 and 4). This shaft 170 extends through an aperture 346 in the rear wall 68 of the trip mechanism casing 1 and carries at its end a driving pinion 171 (see also Fig. 8). This driving pinion 171 is in mesh with a gear wheel 172 (Figs. 7 and 8) freely rotatable on a shaft 173 which is journaled in the boss 190 at the rear of casing 1. Counterclockwise rotation of the pinion 171 thus causes a clockwise rotation of the gear 172. This clockwise rotation of gear 172 is finally translated into a clockwise angular rotation of an operating arm 196 (Figs. 7 and 8) the end of which ultimately engages the projection 203 of the lever 200 and performs the valve closing operation hereinbefore described. The train of gearing whereby this is accomplished will now be set forth.

Operating arm 196 is shown as being formed integral with a drum 192. The hub 347 of this drum is shown as pinned to the shaft 173. The shaft 173 also carries a pointer 174 cooperating in a manner to be hereinafter described with a dial 218. This pointer as will be described hereinafter, indicates the total amount of liquid that has been delivered in any one cycle.

The shaft 173 is driven in a clockwise direction in order to drive the arm 196 by the aid of a gear 179 fixed to the shaft 173 as by pins 348 (Fig. 7). This gear in turn is driven from gear 172 through a transmission mechanism of comparatively large reduction. Thus rotation of gear 172 causes a corresponding rotation of an arm 176 attached to the gear wheel 172. This arm 176 carries a pin or stub shaft 177 upon which is freely rotatable a planetary pinion 178. This planetary pinion has a wide face and engages with the gear 179 as well as with a gear 180, which may be considered for the present as stationary. By appropriate choice of the relative number of teeth in gears 179 and 180 the planetary rolling of pinion 178 upon the gear 180 will cause the gear 179 to be rotated at a slow rate in a clockwise direction. For example, by making the number of teeth of gear 179 one less than on gear 180, for each complete revolution of gear 172 the gear 179 will have advanced by one tooth in a clockwise direction. If the number of the teeth in gear 179 is sufficiently close to the number of teeth in gear 180, the teeth on pinion 178 need not be specially formed to be in sufficiently good contact with both sets of teeth.

As the driving pinion 171 is rotated in accordance with the amount of liquid being delivered through the metering device 6, the shaft 173 is thus angularly advanced; and therefore the arm 196 is correspondingly advanced.

During clockwise motion of arm 196 and drum 192 as just described, a clock spring 193 is wound up. This clock spring is located within the drum 192. Its outer end 195 is attached to the inner surface of the drum 192. Its inner end is attached to a pin 194 that extends from the bearing standard 191. This standard also provides a journal for the shaft 173.

Upon completion of the delivery cycle by movement of arm 196 from its initial position of Fig. 8 to the depression of lever 200, the spring 193 is rendered effective to return the arm 196 to this initial position. How this is accomplished will now be described.

The gear wheel 180, which it was assumed was stationary during the period of liquid delivery, is shown as mounted upon the back of a cog wheel 182 as by the aid of the screws 349. This cog wheel, with gear 180 is free to rotate on the hub of the gear 179. During the delivery cycle the cog wheel 182 is restrained from movement in either direction, so that the planetary transmission is effective angularly to advance the gear 179, and therefore the shaft 173.

This restraint is provided by a locking pawl 183 (Figs. 7, 8 and 13). Locking pawl 183 is shown as carried by an arm 184 having a hub freely rotatable on the pin 106. The locking pawl 183 is urged toward locking position by a tension spring 185 anchored to the ear 186 on the arm 184 and anchored at its lower end in the common anchor 111. The locking pawl arm 184 carries a projection 188 which is adapted to be engaged by the arm 187 formed integral with the driven arm 75. When the valve 5 is closed and the control driven arm 75 is in the position of Fig. 13, the arm 187 urges the locking pawl arm 184 against the tension of spring 185 to the freeing position shown in Fig. 13. However, when the control driven arm 75 is moved in a clockwise direction and latched in either of its two open positions, the arm 187 permits the pawl 183 to engage the teeth of the cog wheel 182; accordingly wheel 182 is locked even before the valve 5 is opened.

Now as arm 200 is depressed at the end of the cycle by the operating arm 196, the control driven arm 75 is returned to the position of Fig. 13 and the cog wheel 182 is freed. This occurs as soon as the valve 5 closes. At the same time, the pinion 171 stops rotating; and gear wheel 172 is stalled. Accordingly the clock spring 193 is free to act to move arm 196 in a counterclockwise direction. This angular movement of arm 196 causes a corresponding angular movement of shaft 173; the pointer 174 and gear 179. This gear rotates pinion 178, the axis of which is now stationary, and therefore gear 180 is rotated by the pinion 178. Gear 180, bieng joined to cog wheel 182, rotates this wheel in a counterclockwise direction.

If the cog wheel 182 would be left locked by pawl 183, shaft 173 would be prevented from returning to its starting position, because then pinion 178 would also be stalled, and wheel 179 would be locked; this wheel 179 being directly joined to shaft 173, would lock the shaft against rotation.

Provisions are made to ensure the unlocking of the cog wheel 182 if the arm 187 should prove ineffective for this purpose, as by failure of the valve 5 to close. For this purpose the lever 200 and its arm 202 is intended to cooperate with the pad 206 on extension 204 on pilot detent lever 108, positively to free the locking pawl 183 upon a sufficiently continued downward movement of the arm 200 (Figs. 8 and 13).

The clock spring 193 returns the operating arm 196 to the initial position as determined by an adjustable stop 198 which cooperates with a stop 197 (Figs. 7 and 8) upon the front face of the arm 196. In order to set the mechanism to deliver a predetermined quantity of liquid, the stop 198 is adjustable so that the angle traversed by arm 196 is therefore adjusted.

For this purpose the stop 198 is carried by gear wheel or setting gear 208 freely rotatable on a hub 347. This gear wheel is adapted to be adjusted by pinion 209 (Fig. 7). This pinion 209 is carried by a shaft 210 (Figs. 7, 8 and 9) projecting through the front wall of the cover 2 and journaled therein. This shaft 210 is also journaled near its inner end in the extremity of an arm 211 shown as integral with the bearing standard 191 that supports the shaft 173. Rotation of shaft 210 by the aid of a handle 212 causes the stop 198 to be advanced or retracted as desired.

This setting gear 208 also carries the dial 218 (Figs. 1 and 7) with which the pointer 174 cooperates. The amount of liquid to be delivered in each cycle is indicated on dial 218 by the stationary pointer 219 (Fig. 1) supported from the edge of the flange 350 (Fig. 7) which supports the glass window 3. This glass window is provided so as to enable the operator to view the dial 218 and pointer 174. It is supported on the outside of the cover 2 as by the aid of the flanged ring 401 (Fig. 7).

Thus as handle 212 is rotated, the dial 218 is correspondingly rotated and the pointer 219 indicates the quantity of liquid that is to be delivered. For the setting shown in Fig. 1, the delivery is set at 3.6 units, which may be in gallons or any other quantity. The pointer 174 during the setting of dial 218 remains at the zero of the dial 218; this is so because it is attached to the end of the shaft 173; this shaft in turn as heretofore stated, is urged by the clock spring 193 in a counterclockwise direction until stops 197 and 198 are in engagement.

Now assuming that delivery of the liquid begins, the pointer 174 moves in a clockwise direction and indicates directly on the dial 218 what quantity has already been delivered and also what quantity requires to be delivered before the pointer 174 reaches the shut-off position indicated by the stationary pointer 219.

It may be desirable at times to ensure against unauthorized adjustment of the quantity to be delivered in a cycle. For this purpose the adjusting or setting shaft 210 may be locked. For example, the shaft 210 carries a locking gear 213 (Figs. 7 and 9). This locking gear is carried on the hub of the pinion 209. This gear 213 can be locked by a spring pressed pawl 351, slidable in an aperture in the cover 2, and projecting out of the casing. It is urged toward locking position by the aid of a compression spring 220. The right hand end of locking pawl 351 is attached to a handle 215 exterior of the casing cover 2, as by riveting. This handle 215 is guided by the aid of a bracket 216 (Figs. 7, 9 and 12) attached to the front of the cover. This bracket 216 may be provided with a vertical guide pin 352 engaging in a slot 353 in the handle 215. The handle 215 may be provided with an upstanding portion 217 for ready manipulation.

In the position shown in Fig. 9 the adjusting mechanism is locked by pawl 351. By pulling upon the projection 217 toward the right, the adjustment mechanism may be released. In order to prevent unlocking movement of the locking pawl 351, the handle 215 and the bracket 216 may be provided with apertures 229, 230, 231 and 232 adapted to be in registry when the locking pawl is effective. Through any pair of apertures 229, 231, or 230, 232, may be passed a padlock preventing movement of the handle 215. If it is desired to lock the device against delivery of any liquid whatever, the padlock may be passed through the slot 228 in the extension 227 of the handle 4, as well as through the alined apertures 229 and 231. By passing the padlock through the alined apertures 230 and 232, the adjusting mechanism is locked, but the handle 4 may be swung in a direction to open the valve; but the padlock serves as a stop to prevent the handle 4 from being turned in a counterclockwise direction.

It may be noted that if the handle 4 is left unlocked, it may be moved in a counterclockwise direction, even after a delivery cycle is started, to place the valve 5 in dribble position. This dribble continues until the valve 5 is ultimately fully closed by operation of the arm 196 on lever 200. Alternatively it is possible to move the handle 4 in a counterclockwise direction still further to close the valve entirely, and if the handle 4 is held so that the plate 90 holds the control driven arm 75 slightly raised, then even if the valve 5 is entirely closed, the locking pawl 183 for the cog wheel 182 is not released. This slight raising of arm 75 is permitted within the limits of the lost motion connection between arm 75 and link 73, as shown in Fig. 8. This position of the arm 75 is maintained by the aid of the detent arm 112, which holds the arm 75 in this position corresponding to a fully closed valve and yet advanced sufficiently in a clockwise direction to ensure that the locking pawl 183 remains in contact with the cog wheel 182. In other words, the pointer 174 is stopped in an intermediate position, indicating part delivery of a cycle. Upon reopening the valve 5 by moving the handle 4 in a clockwise direction, either to dribble or full open position, this cycle may be completed. Alternatively, however, the handle 4 may be turned far enough to permit arm 75 to return to the position of Fig. 14; thereby arm 187 depresses the projection 188 of the locking pawl arm 184, disengaging pawl 183 from cog wheel 182. Under such circumstances, the pointer 174 as well as the control mechanism is returned to the beginning position of Fig. 1.

When the operating arm 196 at the conclusion of a cycle depresses lever 200, it is seen that the pilot latch member 121 is first moved to the dribble position, and then later on it is moved to the fully closed position. This prevents the creation of injurious water hammer, the valve 5 closing in a number of steps.

It may be required at times to adjust the dial 218 and the pointer 174 to deliver such a small quantity of liquid in a cycle that the operating arm 196 has an initial or starting position such that it is still in contact with the lever 200. Under such circumstances, the valve 5 can be opened only to dribble position. As seen in Figs. 15 and 16, when the lever 200 is partially depressed, the latch arm 81 carried by the control driven arm 75 is rocked slightly toward the left, so that the plate 90 is out of contact with the narrow lower step 89 of plate 88 on the latch arm 81. Accordingly, when the driving arm 91 is rotated in a clockwise direction by the handle 4, it will clear this stepped surface 89, but it will ultimately engage the upper stepped surface 235 of plate 88; this occurs only after the lost motion is taken up between plate 90 and step 235. Accordingly complete rocking of the driving arm 91 will raise driven arm 75 only sufficiently to engage the latch stud 120 with the lower stepped surface 124 of the pilot latch member 121.

The liquid meter mechanism 6, is utilized to operate the shaft 170 (Fig. 4) for operating the control mechanism 1. A housing 142 is provided for the metering elements. This housing 142 as shown most clearly in Fig. 4, has a projecting boss 354 (see also Fig. 2) through which the meter shaft 170 extends. In order to provide a fluid tight seal between the casing 1 of the control mechanism and the meter 6, this hollow boss 354 is provided with a flange 355. This flange is sealed against the edge of aperture 354 as by the packing 356. Where the shaft 170 passes through the flange 355, a collar 357 is fastened to the flange; this collar tightly encompasses the shaft 170. Disposed around the shaft are the chevron packing rings 358 urged toward the collar 357 by the compression spring 359 located within the boss 354. The right hand end of the spring 359 abuts the stationary collar 360.

The measurement of the liquid is primarily effected by a pair of substantially identical rotors 140 and 141 rotatably supported within the housing 142. The housing has a sealed cover 362. The rotors 140 and 141 are of such axial length that their end surfaces are in fluid tight contact with the opposed surfaces of case 142 and cover 362.

The rotors have shafts 170 and 361 rotatably supported as by the aid of anti-friction ball bearings 143, located in appropriately formed recesses in the casing wall and in the cover 362.

Each of the rotors 140 and 141 has a portion of large diameter making substantially fluid tight contact with the curved portion of casing 142 (Fig. 3); as well as a portion of reduced diameter. The large diameter portion occupies an angle slightly less than half the circumference. The rotors are assembled with the large diameter periphery of one against the small diameter periphery of the other (Fig. 3).

By virtue of the intermeshing gears 144 and 145 respectively fastened to extensions of the shafts 170 and 361, the two rotors 140 and 141 are maintained in synchronism and in proper relative angular relationship as they revolve.

Disposed in a fluid tight manner over the casing cover 362 is a supplemental cover member 363 which encloses the gears 144 and 145. Adjacent the place where the rotors are in contact, the casing 142 provides a passage 16 forming an inlet to the rotors and an outlet 364. With liquid under pressure entering housing 142 through the inlet 16, and for the relative position of the rotors as illustrated in Fig. 3, both of the radial surfaces 148 and 149 of the rotor 141 are exposed to the inlet pressure. Since these surfaces are designed to be equal, their turning moments about the pivot of the rotor 141 are neutralized. However, in connection with rotor 140, the inlet pressure is effective upon the radial surface 151 but is not effective on the radial surface 150. Accordingly a torque will be exerted on rotor 140 in a counterclockwise direction. The rotor 141 will be driven by rotor 140 through gears 144, 145, in a clockwise direction.

The outer edge of surface 149, after a sufficient angular movement, beyond the position of Fig. 3, enters into contact with the edge 365 of the housing 142. Some liquid is thus trapped between the radial surfaces 148, 149, the smaller peripheral surface of the rotor 141, and the inner curved surface of the housing 142. This liquid is later discharged into the outlet 364. The discharge begins when the radial surface 148 advances beyond the edge 366 of the housing 142. During all this time, the pressure of the intake liquid is still ineffective to rotate the rotor 141, since the torque upon the axis of shaft 361 is balanced.

Upon continued rotation of rotor 141, the radial surface 148 approaches the dotted line position of Fig. 3. At the same time the upper rotor 140 has advanced in a counterclockwise direction to bring its radial surface 150 near the radial surface 148. Ultimately the dotted line position of Fig. 3 is reached. During all this period, the rotor 140 has been the driving rotor.

Just as soon as the dotted line position of Fig. 3 is passed, both radial surfaces 150 and 151 of the upper rotor 140 are exposed to the pressure of the fluid in the intake passage 16. Accordingly the turning moment on this rotor for this stage of operation is balanced. However, the radial surface 148 of the lower rotor 141 is now exposed to the intake pressure, while the other radial surface 149 is not exposed to intake pressure. Accordingly a turning moment is now exerted upon the rotor 141 which becomes the driving rotor. This continues for another 180° of rotation. In the meanwhile the liquid trapped between the respective radial surfaces is discharged into the outlet 364.

Devices of this character can readily be made to measure with great accuracy; of the order of one-half of one percent. The operation is analagous to that of a gear pump; in fact the device may be considered as such, having gears of one tooth only. Pockets or sumps 155 and 156 (Figs. 3 and 6), are formed in the side walls opposite the place where the rotors approach each other. Such sumps, as explained in Patent No. 2,262,231, are of utility to prevent annoying knock or water hammer. Both ends of space 157 lead into these pockets at the sides of the housing 142. Entry or exit to this space 157 is therefore unrestricted, instead of being confined to the passage 153. These sumps do not affect the accuracy of the device or enter into the quantity of liquid passed in one revolution from the inlet to the outlet.

The liquid meter devices herein described are shown in Patent No. 2,262,231, issued November 11, 1941, in the name of Francis W. Guibert and Frederic B. Fuller.

A brief summary of the automatic operation of the device for limiting the delivery of liquid through the valve 5 may now be set forth. It may be assumed that the apparatus is in the valve closing position illustrated in Figs. 1, 7 and 8.

First of all, the operating handle 4 is moved in a clockwise direction. The first affect of this is to rotate the driving arm 91 so as to carry the latch arm 81 upwardly, or in a clockwise direction about the axis of the shaft 76. Thereby the control driven arm 75 is also given a clockwise motion. Before the lost motion connection is taken up between slot 125 and pin 400 of the valve opening mechanism, the lock 112 passes under the control driven arm 75 to hold it against return to the central position. At the same time arm 187 (Fig. 13) has moved sufficiently far upwardly to permit engagement of the locking pawl 183 with the cog wheel 182.

Continued movement of the handle 4 causes the valve 5 to be opened to a dribble position, by a pull on link 73 toward the right. As soon as the dribble position is reached, latch stud 120 engages step 124 of the latch extension 122. Continued movement of the handle 4 lifts the latch stud 120 further and the upper surface of the latch 122 engages under this stud. The valve is now in full open position.

Once the latch stud 120 is thus engaged on the top of the latch extension 122, the handle 4 can be released and the centralizing mechanism returns the handle to the position of Fig. 1. However, since the control driven arm 75 is latched in the open position by latch extension 122, the valve 5 remains open.

Just as soon as liquid is delivered through the valve 5, the gear wheel 172 is rotated by the rotation of the metering device 6. This gear 172 through the planetary pinion 178 causes a slow advancement of the shaft 173 away from the zero position of Figs. 7 and 8. Ultimately the operating arm 196 engages the projection 203 of lever 200, and the shutting off operation begins. The first affect of the depression of lever 200 is to release the lock 112 by engagement of the arm 202 of lever 200 with the extension 204. Shortly thereafter the pilot detent lever 121 is similarly released and the latch stud 120 drops to the step 124. The valve 5 is now in a dribble position. Continued rotation of lever 196 causes further depression of arm 200 sufficient to cause the latch stud 120 to drop to the closed position and immediately thereafter the pad 206 of the locking pawl mechanism including the locking pawl 183, is engaged by the arm 202 and the cog wheel 182 is released. The operating arm 196 is returned by the aid of the spring 193 to the starting position with stop 197 against the adjustable stop 198. The mechanism is now ready to function again at the beginning of another cycle.

The force required for the rotation of the gear wheel 172 (Figs. 7 and 8) is provided by the torque created by the rotors of the meter. The turning moment is transmitted to this gear through the pinion 171. In some instances it may be preferable for the sake of greater accuracy, to relieve the metering device 6 from this load.

In the form of the invention illustrated in Fig. 19, provisions are made for accomplishing this result. The metering device in this form serves merely as an escapement for power stored in a long tension spring 241, which thus constitutes a power storing device. The control mechanism is substantially the same as before. The shaft 173 now carries a supplemental pinion 237. Meshing with this pinion is a gear segment 238, pivoted on a pin 239. Fig. 19 shows the spring 241 entirely without tension, and segment 238 in its furthermost position toward the left. This position corresponds to the return of shaft 173 to starting position, the valve 5 being closed. If a tension be placed on spring 241 by pulling its free end toward the right, a force will be exerted on segment 238 that would impress a torque on pinion 237 and urge shaft 173 to rotate in a clockwise direction. However, this force is controlled by the rotation of the rotors in the metering device 6. In other words, the segment 238 is allowed to rotate in this direction only when the metering device 6 permits it.

The right hand end of spring 241 is shown as joined to the arm 240 integral with the control driven arm 75 heretofore described. The power spring 241 is so arranged that when the arm 75 is rocked in a clockwise direction, it will store energy in the power spring 241 by stretching it.

If it is desired to open the valve 5 with this mechanism, the arm 75 first takes up the lost motion connection between slot 125 and pin 400, the lock 112 on pilot detent lever 108 being then effective to prevent the arm 75 from returning to its starting position. The slot 125 may be made longer so as to cause the spring 241 to be stretched to a desired degree prior to the opening of the valve. When the valve opens, the spring 241 has sufficient stored energy to drive the control mechanism through the segment 238, pinion 237 and shaft 173.

The meter rotors now rotate, but they act merely as an escapement for the control mechanism which is driven forward by the power spring 241.

Near the end of the cycle the procedure at first is the same as in the form illustrated in Figs. 7 and 8. The lever 200 first acts to disconnect the latch arm 81 from the operating handle 4; then lock 112 is withdrawn; then the latch extension 122 is withdrawn in two steps from below latch stud 120, and the valve 5 closes first to dribble then to closed position. Immediately thereon the stopping pawl 183 is disengaged. The control driven arm 75 which is permitted extra travel, continues still further under the pull of the power spring 241 until the tension on this power spring is completely relieved, after which the clock spring 193 returns the shaft 173 and the pointer 174 to their original setting. This latter action also returns segment 238 to the position of Fig. 19. The slot 125 in the link 73 is elongated sufficiently toward the left to permit the return of the spring 241 to a fully relaxed position.

What is claimed is:

1. In a device of the character described, a control valve, means for operating said valve, including a control driven arm for causing said valve to open, means for releasably retaining said driven arm in full valve opening position or optionally in a position to cause less than full opening of the valve, means, operating upon the delivery of a predetermined amount of liquid through the valve, to release said driven arm, means for adjusting the said operating means, whereby to alter the amount, the delivery of which will cause said operating means to act, a driving arm to actuate said driven arm to a position where it is releasably retained, and means adapted to form an operating connection between the driving arm and the driven arm, said means including a latch plate carried by one of said arms and movably with respect to said one arm, and having stepped surfaces, and means carried by the other arm cooperating with the latch plate whereby movement is transmitted from the driving arm to the driven arm, said latch plate being movable on its supporting arm from a position where it transmits the full motion of the driving arm to the driven arm to cause the valve to open fully, to a position where it transmits the motion of the driving arm to the driven arm to cause the valve to open only partly, as well as movable to a position where it is incapable of transmitting any motion from the driving arm to the driven arm, and means for causing said latch plate to assume said position that causes the valve to be opened only partly, said means being operated in response to the adjustment of said operating means for delivery of a predetermined amount of liquid below a definite value.

2. In a device of the character described, a control valve, means for operating said control valve, including a control driven arm for causing said valve to open and to close, means for latching said driven arm in valve opening position, unlatching mechanism including an operating arm operating from a starting position, as well as means for moving said operating arm in accordance with the amount of liquid delivered through the valve, said mechanism also including return means to return the operating arm to starting position, means, operating in response to the movement of the driven arm toward valve opening position, to lock said return means, and means for operating the unlatching mechanism to release the driven arm to cause the valve to close, as well as for unlocking said return means, and actuated by the operating arm at the end of the delivery cycle.

3. In a device of the character described, a control valve, means for operating said valve, including a control driven arm for causing said valve to open and to close, means adapted to be moved in one direction for actuating said driven arm, means for latching said driven arm in valve opening position, unlatching mechanism including an operating arm operating from a starting position, as well as means for moving said operating arm in accordance with the amount of liquid delivered through said valve, said mechanism also including return means to return the operating arm to starting position, means, operating in response to the movement of the driven arm toward valve opening position, to lock said return means, means for operating the unlatching mechanism to release the driven arm to cause the valve to close, as well as for unlocking said return means, and actuated by the operating arm at the end of the delivery cycle, and means operating upon a reverse movement of said actuating means for unlocking said return means.

4. In a device of the character described, a control valve, means for operating said valve, including a control driven arm for causing said valve to open and to close, means adapted to be moved in one direction for actuating said driven arm, means for latching said driven arm in valve opening position, unlatching mechanism including an operating arm operating from a starting position, as well as means for moving said operating arm in accordance with the amount of liquid delivered through said valve said mechanism also including return means to return the operating arm to starting position, means operating in response to the movement of the driven arm toward valve opening position, to lock said return means, means for operating the unlatching mechanism to release the driven arm to cause the valve to close, as well as for unlocking said return means, and actuated by the operating arm at the end of the delivery cycle, and means operating upon a reverse movement of said actuating means for unlatching the driven arm and for unlocking said return means.

5. In a device of the character described, a control valve, means for operating said valve, including a control driven arm for causing said valve to open and to close, means adapted to be moved in one direction for actuating said driven arm means for latching said driven arm in valve opening position, unlatching mechanism including an operating arm operating from a starting position, as well as means for moving said operating arm in accordance with the amount of liquid delivered through said valve, said mechanism also including return means to return the operating arm to starting position, means for operating in response to the movement of the driven arm toward valve opening position, to lock said means for operating the unlatching mechanism to release the driven arm to cause the valve to close, as well as for unlocking said return means, and actuated by the operating arm at the end of the delivery cycle, and means operating upon a reverse movement of said actuating means for reducing the valve opening.

6. In a device of the character described, a control valve, an arm for operating said valve, said arm having at least two positions, corresponding respectively to closed and open positions of the valve, means for moving said arm to a definite valve opening position, means for returning said arm to valve closing position, means whereby said arm is releasably retained in said valve opening position, means movable in accordance with the amount of liquid delivered through the valve, and capable of attaining an ultimate position, such as to release said arm to permit its return to valve closing position, said releasable means being retained in stationary position and serving to retain the arm in valve opening position until said movable means is at least close to its ultimate position, an energy storing device connected to said arm for operation thereby to store substantial energy upon application of force moving the arm toward valve opening position, and a connection for supplying said stored energy as motive power to said movable means.

7. In a device of the character described, a control valve, an arm for operating said valve, said arm having at least two positions, corresponding respectively to closed and open positions of the valve, means for moving said arm to a definite valve opening position, means for returning said arm to valve closing position, means whereby said arm is releasably retained in said valve opening position, means movable in accordance with the amount of liquid delivered through the valve, and capable of attaining an ultimate position, such as to release said arm to permit its return to valve closing position, said releasable means being retained in stationary position and serving to retain the arm in valve opening position until said movable means is at least close to its ultimate position, said movable means including a transmission mechanism moved continuously with the passage of liquid through the valve, and an energy storing device connected to said arm for operation thereby to store substantial energy upon application of force moving the arm to valve opening position, said energy storing device being connected to said transmission and supplying motive power thereto.

8. In a liquid delivery device, a valve through which the liquid passes, a liquid flow meter for measuring the quantity of liquid delivered, and a valve control system comprising, an operating member, mechanism operatively connecting said member with the valve for causing the valve to open in accordance with movement of said member, means urging the valve to closed position, means for releasably retaining said mechanism to hold said valve partly or completely open in accordance with the extent of said movement, and means for releasing said retaining means and operated by movement of said operating member in a direction opposite to that which opens the valve.

9. In a liquid delivery device, a valve through which the liquid passes, a liquid flow meter for measuring the quantity of liquid delivered, and a valve control system comprising, an operating member, means supporting said member so that it is capable of optional movement in either of two directions from a neutral position, mechanism operatively connecting said member with the valve for causing the valve to open upon movement of said member in one direction from its neutral position, means urging said mechanism to valve closing position, means for releasably retaining said mechanism in position to hold said valve partly or completely open in accordance with the extent of said movement, means for releasing said retaining means and operated by movement of the operating member in the other direction from its neutral position, a transmission connected to the meter, and means operating upon predetermined travel of said transmission for releasing said retaining means.

10. In a liquid delivery device, a valve through which the liquid passes, a liquid flow meter for measuring the quantity of liquid delivered, and a valve control system comprising, an operating member, means supporting said member so that it is capable of optional movement in either of two directions from a neutral position, mechanism operatively connecting said member with the valve for causing the valve to open upon movement of said member in one direction from its neutral position, means urging said mechanism to valve closing position, means for releasably retaining said mechanism in position to hold said valve partly or completely open in accordance with the extent of said movement, means for releasing said retaining means and operated by movement of the operating member in the other direction from its neutral position, a transmission connected to the meter, and means operating upon predetermined travel of said transmission for releasing said retaining means, the releasing means operated by the transmission including an element which operates to cause the valve to close while the operating member is stationary, and for any position thereof.

11. In a liquid delivery device, a valve through which the liquid passes, a liquid flow meter for measuring the quantity of liquid delivered, and a valve control system comprising, an operating member, mechanism operatively connecting said member with the valve for causing the valve to open, or to close in accordance with the direction of movement of said member, said mechanism including an operating arm movable between an initial position and a definite valve closing position, in accordance with the quantity of liquid delivered, for causing the valve to close when a predetermined quantity of liquid has been delivered, means returning said operating arm to its initial position after said arm has operated to cause the valve to close, and means, when said operating member is operated to cause the valve to close prior to the delivery of said predetermined quantity, for maintaining said returning means ineffective.

12. In a liquid delivery device, a control valve through which the liquid passes, a liquid flow meter for measuring the quantity of liquid delivered, means for operating the valve, including a control driven arm for causing said valve to open and to close, means for latching said driven arm in a definite valve opening position, a driving arm to actuate said driven arm to its latched position, means operating upon the delivery of a predetermined quantity of liquid through the valve to unlatch the driven arm and cause the valve to close, means to adjust the amount of said predetermined quantity, including a rotatable locking gear, and a pawl for releasably engaging said gear to prevent rotation thereof, means operable by a reverse movement of the driving arm for unlatching said driven arm, and means for optionally restraining said driving arm from reverse movement, said means also serving to maintain said pawl in engagement with the locking gear.

13. In a liquid measuring device, a liquid flow meter, a control valve for the liquid, means for opening the valve including a control driven arm, means adapted to engage said arm for releasably maintaining said arm in valve opening position, means, including an operating arm, for releasing said engaging means in response to the delivery of a predetermined amount of liquid through the meter, for causing the valve to close, means for adjusting the amount of angular travel required by the operating arm to cause said arm to affect the releasing means, a scale connected to the adjusting means, a stationary pointer cooperating therewith for indicating the amount of liquid to be delivered in a complete delivery cycle, another pointer operating in unison with the operating arm and cooperating with the scale to indicate directly the amount of liquid delivered at any instant, and means for returning the operating arm to its initial position upon completion of a delivery cycle.

14. In a device of the character described, a control valve, means for operating the valve, including a control driven arm for transmitting force to the valve for causing the valve to open or to close, means for urging said arm to valve closing position, means for latching said arm in a definite valve opening position, and means movable in one direction to cause the arm to open the valve, and movable in another direction for releasing the latching means to cause the arm to return the valve to closed position under the influence of said urging means.

15. In a device of the character described, a control valve, means for operating the valve, including a control driven arm for transmitting force to the valve for causing the valve to open or to close, means for urging said arm to valve closing position, means for latching said arm in a definite valve opening position, a driving arm movable in one direction to actuate said driven arm to its latched position, means operating upon the delivery of a predetermined amount of liquid through the valve to unlatch said driven arm and cause the arm to return the valve to closed position under the influence of said urging means, and means, operable upon a reverse movement of the driving arm for optionally unlatching the driven arm at any time during the delivery of said predetermined amount.

16. In a device of the character described, a control valve, means for operating the valve, including a control driven arm for transmitting force to the valve for causing the valve to open or to close, means for latching said arm in a definite valve opening position, a driving arm to actuate said driven arm to its latched position, means operating upon the delivery of a predetermined amount of liquid through the valve to unlatch said driven arm and cause the valve to close, means, operable upon a reverse movement of the driving arm for optionally unlatching the driven arm at any time during the delivery of said predetermined amount, and locking means for optionally restraining said driving arm from reverse movement, comprising a lever connected for movement with the driving arm, and means adapted to form a stop for engaging said lever.

17. In a liquid measuring device, a liquid flow meter, a valve controlling the flow of the liquid, means for opening the valve, means including a rotatable operating arm for causing the valve to close in response to the delivery of a predetermined amount of liquid through the meter, means for adjusting the amount of angular travel required by the operating arm to cause said arm to affect the valve, a scale connected to the adjusting means and movable therewith, a stationary pointer co-operating with the scale for indicating the amount of liquid to be delivered in a complete delivery cycle, another pointer operating in accordance with the movement of the operating arm and co-operating with the scale to indicate directly the amount of liquid delivered at any part of the cycle, means for returning said operating arm to its initial position, and means responsive to passage of liquid through the meter for causing said returning means to operate upon completion of a delivery cycle.

18. In a device of the character described, a control valve, means for operating the valve, including a control driven arm movable into any one of a plurality of positions for opening the valve to an extent corresponding to the chosen position, means for latching said arm in any one of said positions against return of the arm to a valve closing position, and for releasably holding said arm in said chosen position, and means movable in one direction to move said arm toward valve opening position, and in another direction for releasing the latching means.

19. In a device of the character described, a control valve, means for operating the valve, including a control driven arm for causing said valve to open and to close, means for latching said driven arm in a definite valve opening position, a driving arm, means adapted to place said arms in operative relation, whereby movement of the driving arm serves to actuate said driven arm to its latched position, means operating upon the delivery of a predetermined amount of liquid through the valve to unlatch said driven arm and cause the valve to close, and mechanism co-operating with said last mentioned means for placing the driving arm out of operative relation with the driven arm when the delivery cycle is completed.

20. In a device of the character described, a control valve, means for operating said valve, including a control driven arm for causing said valve to open, means for releasably retaining said driven arm in full valve opening position or optionally in a position to cause less than full opening of the valve, means operating upon the delivery of a predetermined amount of liquid through the valve to release said driven arm, means for adjusting the said last mentioned operating means whereby to alter the amount, the delivery of which will cause said last mentioned operating means to act, a driving arm to actuate said driven arm to a position where it is releasably retained, and means adapted to form an operating connection between the driving arm and the driven arm, said means including a latch plate carried by one of said arms and movable with respect to said one arm, and having stepped surfaces, and means carried by the other arm cooperating with the latch plate whereby movement is transmitted from the driving arm to the driven arm, said latch plate being movable on its supporting arm from a position where it transmits the full motion of the driving arm to the driven arm to cause the valve to open fully, or to a position where it transmits the motion of the driving arm to the driven arm to cause the valve to open only partly, as well as movable to a position where it is incapable of transmitting any motion from the driving arm to the driven arm, and means for causing said latch plate to assume said position that causes the valve to be opened only partly, said means being operated in response to the adjustment of said last mentioned operating means for delivery of a predetermined amount of liquid below a definite quantity, said last mentioned operating means including means for moving said latch plate to said last mentioned position near the end of the delivery cycle.

21. In a liquid delivery device, a valve through which the liquid passes, a liquid flow meter for measuring the quantity of liquid delivered, and a valve control system, comprising an operating member, mechanism connecting said member with the valve for causing the valve to open or to close, dependent upon the optional movement of said operating member, means for releasably maintaining said mechanism in valve opening position, a transmission connected to the meter, and means operating upon predetermined travel of said transmission for releasing said mechanism, said connecting mechanism including a lost motion element whereby said releasing means is operative to cause the valve to close for any position of said operating member, and while said member is stationary.

22. In a liquid delivery device, a valve through which the liquid passes, a liquid flow meter for measuring the quantity of liquid delivered, and a valve control system, comprising an operating member, mechanism operatively connecting said member with the valve for causing the valve to open or to close in accordance with the direction of movement of said member, means movable between an initial position and a definite valve closing position for causing the valve to close independently of said operating member when a predetermined quantity of liquid has been delivered, means for returning said movable means to its initial position after said movable means has operated to cause the valve to close, and means for optionally rendering said returning means effective or ineffective when the valve is closed by operation of said operating member, said means for optionally rendering said returning means effective or ineffective being provided with relatively movable surfaces that are adapted to engage for rendering said returning means effective upon a sufficient movement of the operating member toward valve closing direction.

FRANCIS W. GUIBERT.
FREDERIC B. FULLER.